US008537637B2

United States Patent
Laake (10) Patent No.: US 8,537,637 B2
(45) Date of Patent: Sep. 17, 2013

(54) METHOD OF SEISMIC SURVEYING AND A SEISMIC SURVEYING ARRANGEMENT

(75) Inventor: Andreas Laake, Kinston-upon-Thames (GB)

(73) Assignee: WesternGeco L.L.C., Houston, TX (US)

( * ) Notice: Subject to any disclaimer, the term of this patent is extended or adjusted under 35 U.S.C. 154(b) by 2081 days.

(21) Appl. No.: 10/499,926

(22) PCT Filed: Dec. 19, 2002

(86) PCT No.: PCT/GB02/05821
§ 371 (c)(1),
(2), (4) Date: Jun. 18, 2004

(87) PCT Pub. No.: WO03/056362
PCT Pub. Date: Jul. 10, 2003

(65) Prior Publication Data
US 2005/0024990 A1 Feb. 3, 2005

(30) Foreign Application Priority Data
Dec. 22, 2001 (GB) .................................. 0130871.7

(51) Int. Cl.
*G01V 1/02* (2006.01)
(52) U.S. Cl.
USPC ................................ 367/56; 367/54; 181/111
(58) Field of Classification Search
USPC ............ 367/54, 38, 50–51, 56, 117; 181/111
See application file for complete search history.

(56) References Cited

U.S. PATENT DOCUMENTS

| 3,716,111 | A | * | 2/1973 | Lavergne | 367/75 |
| 3,794,827 | A | * | 2/1974 | Widess | 367/54 |
| 4,069,471 | A | * | 1/1978 | Silverman | 367/54 |
| 4,359,766 | A | * | 11/1982 | Waters et al. | 367/38 |
| 4,498,157 | A | * | 2/1985 | Martin et al. | 367/50 |
| 4,577,298 | A | * | 3/1986 | Hinkley | 367/50 |
| 4,695,984 | A | * | 9/1987 | Paal | 367/54 |
| 4,777,628 | A | * | 10/1988 | Rietsch | 367/13 |
| 4,803,669 | A | * | 2/1989 | Airhart | 367/72 |
| 4,807,200 | A | * | 2/1989 | Montes et al. | 367/76 |

(Continued)

FOREIGN PATENT DOCUMENTS

| EP | 0425250 A | 5/1991 |
| EP | 0421658 | 10/1991 |

(Continued)

OTHER PUBLICATIONS

Brzostowski. "3-D tomographic imaging of near-surface seismic velocity and attenuation." Geophysics, Mar. 1992.*

(Continued)

*Primary Examiner* — Ian Lobo (57) ABSTRACT

A method of seismic surveying A method of seismic surveying comprises the step of acquiring imaging seismic data relating to an underlying geological structure at a survey location and simultaneously, or substantially simultaneously, acquiring statics seismic data relating to the near-surface (5) at the survey location. The method may use an imaging source (12) to acquire the imaging seismic data and a separate statics source (13,13') to acquire the statics seismic data. Alternatively only an imaging source (12) may be used, and the statics seismic data may be obtained from surface waves, airwaves or ground-roll waves that are generated by the imaging source and that have hitherto been regarded only as unwanted noise.

13 Claims, 5 Drawing Sheets

(56) References Cited

U.S. PATENT DOCUMENTS

| | | | |
|---|---|---|---|
| 4,914,636 A | | 4/1990 | Garrotta |
| 4,933,912 A | * | 6/1990 | Gallagher ........................ 367/59 |
| 5,005,665 A | * | 4/1991 | Cheung ......................... 181/101 |
| 5,010,976 A | * | 4/1991 | Airhart ......................... 181/108 |
| 5,136,550 A | * | 8/1992 | Chambers ....................... 367/38 |
| 5,587,968 A | * | 12/1996 | Barr .............................. 367/75 |
| 5,969,297 A | * | 10/1999 | Ambs ........................... 181/113 |
| 5,970,023 A | * | 10/1999 | Chambers et al. .............. 367/63 |
| 6,052,333 A | | 4/2000 | Williams |
| 6,181,646 B1 | * | 1/2001 | Bouyoucos et al. .......... 367/189 |
| 6,338,394 B1 | * | 1/2002 | Meynier ........................ 181/113 |
| 6,791,901 B1 | * | 9/2004 | Robertsson et al. ............ 367/58 |
| 6,903,999 B2 | * | 6/2005 | Curtis et al. .................... 367/38 |

FOREIGN PATENT DOCUMENTS

| | | | |
|---|---|---|---|
| GB | 2306219 A | | 4/1997 |
| GB | 2341680 | * | 3/2000 |
| WO | WO 99/60423 | | 11/1999 |
| WO | WO0072049 | * | 11/2000 |
| WO | WO 01/16622 | | 3/2001 |
| WO | WO0153853 | * | 7/2001 |

OTHER PUBLICATIONS

International Search Report, dated May 16, 2003, for PCT/GB02/05821.

International Preliminary Examination Report, dated Mar. 24, 2004, for PCT/GB02/05821.

McQuillin, Bacon and Barclay, "An Introduction to Seismic Interpretation," *J. Sedimentary Res.*, 55(6):940-941, Nov. 1985.

* cited by examiner

FIG 1

Example of P-wave and S-wave statics

FIG 2

Definition of sensor perturbations and sensor statics

FIG 3

Sourses of noise in statics acquisition

FIG 4

Design of acquisition time for
imaging and statics records

FIG 5

Design of the geometry for the acquisition
of imaging and statics record

FIG 6

| | Depth | Method |
|---|---|---|
| | 0 > 50cm (surface layer) | Wave mode with shallow penetration |
| | 50cm to ~ 50m (weathering layer) | Wave modes with shallow penetration : surface waves, ground roll |
| | Consolidated rock | Velocity profile to be obtained from full shot data |

Required wave fields for statics
determination and correction

METHOD OF SEISMIC SURVEYING AND A SEISMIC SURVEYING ARRANGEMENT

The present invention relates to a method of seismic surveying, and in particular relates to a method of seismic surveying for use at a survey location where the earth's interior at or near the earth's surface has different seismic properties to the underlying layer(s) of the earth's interior and it is desired to obtain information about the properties of the near-surface region of the earth's interior. The invention also relates to a seismic surveying arrangement.

Figure 1:
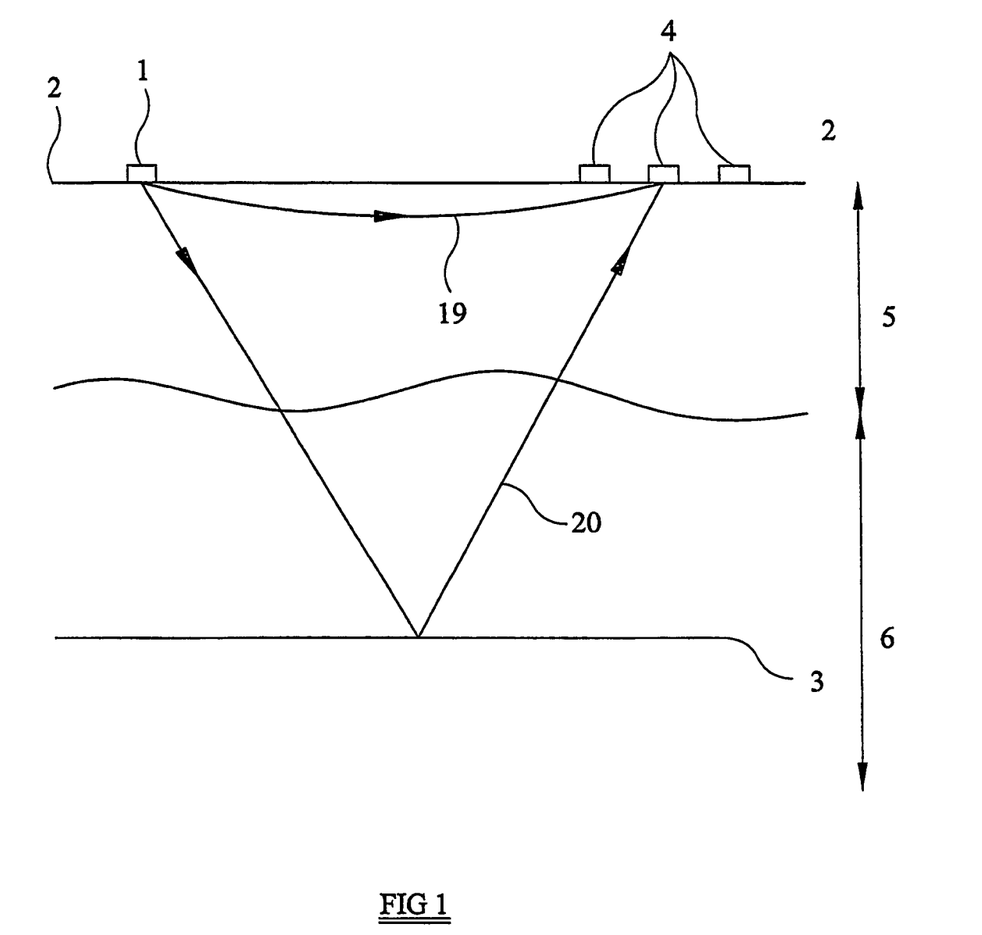
FIG. 1 is a schematic view of a land-based seismic survey.

FIG. 1 is a schematic view of a land seismic surveying arrangement. In this arrangement seismic energy is emitted by a seismic source 1 that is disposed on or in the earth's surface 2. When the source is actuated seismic energy passes into the earth's interior and propagates downwards through the earth's interior until it is reflected by a geological feature that acts as a partial reflector 3 of seismic energy. The reflected seismic energy passes upwards through the earth's interior, and is detected by an array of seismic receivers 4 disposed on the earth's surface. Information about the earth's interior is obtained, for instance, by determining the travel time of seismic energy from the seismic source 1 to the receivers 4. Only one reflector 3 is shown in FIG. 1 but, in practice, a number of geological features within the earth's interior will act as partial reflectors for seismic energy.

Only one source 1 is shown in FIG. 1 but in practice a land seismic surveying arrangement has an array of sources. The energy of the emitted seismic energy has to be sufficiently high to illuminate geological structures deep within the earth, and it is generally necessary to use an array of sources to obtain the required energy.

The geological structure of the earth is not uniform. One problem encountered in processing seismic data is that the seismic properties of the earth in a region 5 at or near the earth's surface are frequently significantly different from the properties of the underlying geological structure 6. The underlying geological structure 6 is hereinafter referred to as the "basement", and the region 5 at or near the earth's surface is hereinafter referred to as the "near-surface". The near surface may also be referred to as a "weathering layer", since weathering of the near surface is one cause of difference in seismic properties since this makes the near-surface 5 less consolidated than the basement. In particular, the velocity of seismic energy may be significantly lower in the near-surface 5 than in the basement 6. This difference in velocity will produce a shift in the travel time of seismic energy compared to the travel time that would be recorded if the near-surface and the basement had identical seismic properties, and these shifts in travel time are generally known as "static shifts", or just "statics".

The near surface 5 is shown at the surface of the earth's interior in FIG. 1, but it need not extend to the surface 2 and there could be a further layer overlying the near-surface. The boundary between the near-surface and the basement may not be distinct, and the earth's properties may change gradually.

The static shift generated by the near-surface 5 depends on the thickness of the near-surface, and on the velocity of propagation of seismic energy through the near-surface. Lateral variations usually occur in both the thickness of the near-surface 5 and the propagation velocity through the near-surface, so that the static shift observed at a seismic receiver at one location is likely to be different from the static shift observed at a receiver at another location. To a first approximation, the entire data set recorded at one receiver will be advanced or delayed by a static time shift relative to data recorded at another receiver. It is highly desirable to take account of the static shift when processing seismic data. Unless these static shifts are removed from the seismic data, ambiguity will exist as to whether variations in arrival times of seismic events from deeper layers are due to variations in the depth or lateral locations of those deeper layers, or simply arise owing to propagation effects in the near-surface 5.

Figure 2:
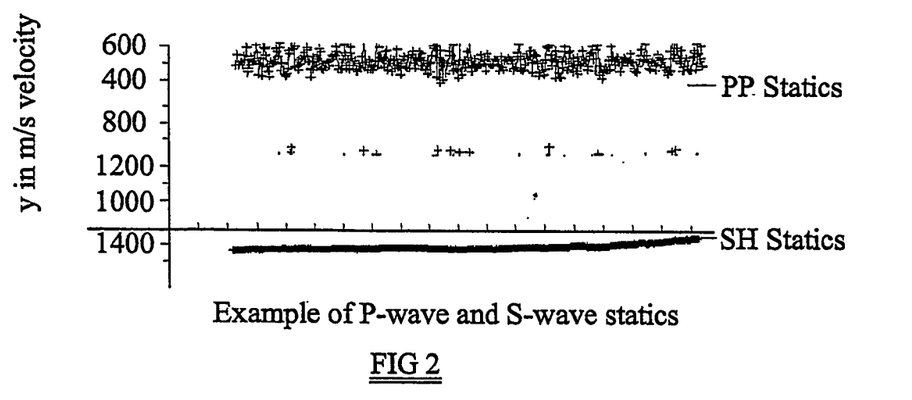
FIG. 2 shows static shifts for p-waves and s-waves.

The problem of the static shifts caused by the near surface is particularly significant for multi-component seismic data. This is because the static shift for an S wave (shear wave) is generally much greater than the static shift for a P-wave (pressure wave), owing to the fact that transverse waves such as S-waves are more sensitive to lateral coupling within the earth. This is illustrated in FIG. 2. The x-axis in FIG. 2 represents lateral distance from the source. In general, very near-surface static shifts have the biggest amplitudes and have a considerable impact on the overall static shift because of the low propagation velocities for seismic waves in the near-surface.

A further problem that arises in processing seismic data is that errors may arise owing to variations in orientation, position or sensitivity of the sensors. These effects are known as sensor perturbations, and are independent from the geology of the near-surface.

One example of a sensor perturbation is sensor tilt. This is particularly important for a multi-component sensor, which is intended to record the components of the received particle motion along the sensor's x-, y- and z-axes. If the sensor is deployed so that its internal z-axis is not oriented vertically, cross feed will occur between the vertical component and the horizontal components of seismic energy recorded by the sensor.

A further cause of sensor perturbations is planting error. A planting error occurs when a receiver is not deployed at its intended position but at a position that is laterally and/or vertically deviated from the intended position of the receiver. Such planting errors cause a variation in the travel path of seismic energy to the receiver, compared to the expected travel path to the intended receiver position, and these cause variations in the arrival time of seismic energy at the receiver. These arrival time variations are independent from and additional to the static shift induced by the near-surface.

A further cause of sensor perturbations is variations in sensitivity from one receiver in an array to another receiver of the array. These variations, however, do not affect the arrival time of seismic energy at the sensor.

A further problem encountered in processing multi-component seismic data is that a receiver may record one component of the seismic data more accurately than another component. This is known as "vector infidelity".

Figure 3:
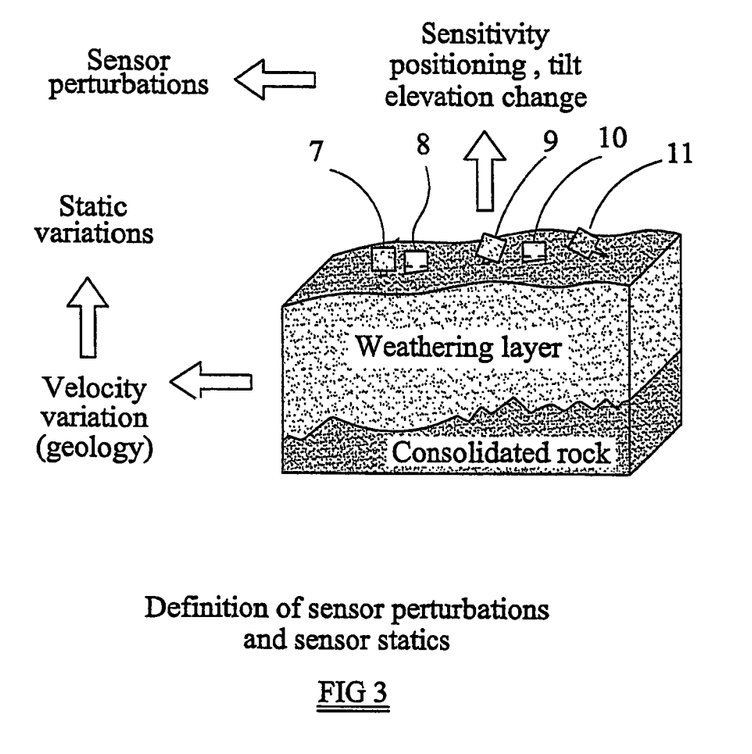
FIG. 3 is a schematic illustration of the static shift and of sensor perturbations.
Figure 4:
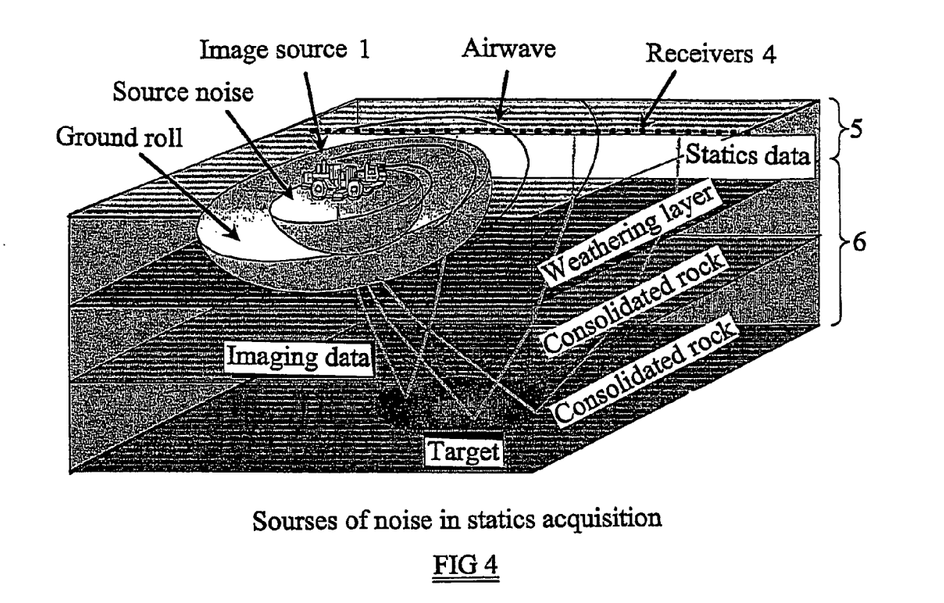
FIG. 4 is a schematic illustration of sources of noise in a land-based seismic survey.

FIG. 3 is a schematic perspective view illustrating static shift and sensor perturbations in a typical land-seismic survey. Of the five receivers 7 to 11 shown in FIG. 3, two receivers—the receivers 9, 11—are not orientated vertically, so that the internal z-axes of these receivers are tilted with respect to the vertical. This receiver tilt will give rise to sensor perturbations that affect seismic data acquired by receivers 9 and 11. It will also be noted that each of the receivers in FIG. 3 has a different elevation, and these elevation differences again give rise to sensor perturbations.

The conventional method for correcting seismic data for the static shifts caused by the near-surface is to assume that variations in the static shift from one receiver to another are small. This assumption is reasonable if the receivers are located close to one another. On this assumption, the conventional technique is to replace the local arrival time. at each individual receiver by an average arrival time that has been obtained by averaging the local arrival times over the distance of one receiver group. This results in a smearing of the local time shifts which, in turn, causes the seismic image obtained by processing the data to be blurred. This is unsatisfactory, particularly, if high-resolution imaging and/or multi-component imaging is desired.

A further problem with this prior art approach is that it makes it very difficult to correct the seismic data for sensor perturbations. In order to correct the data for sensor perturbations, it is necessary to have high-resolution data for each receiver.

EP-A-0 421 658 discloses a method of seismic surveying that uses data acquired at both seismic receivers disposed at the earth's surface and sensors buried within the earth to obtain information about the near surface. The method is however unsuitable for practical implementation, since burying sensors within the earth is a difficult and costly process.

When a seismic source is actuated in a land-based seismic survey some seismic energy paths from the source to the receiver exist that lie wholly within the near-surface 5. An example of these is indicated in FIG. 1, as path 19. Seismic data that arises from paths that lie wholly within the near-surface may be used to obtain information about the near surface, and these data are referred to as "statics data". Seismic data that arises from seismic energy that follows a path involving reflection at an underlying geological structure (such as the path 20 in FIG. 1) provide information about the geological structure of the basement, and these data are referred to as "imaging data".

One seismic source frequently used in a land-based seismic survey is a vibrator source. A vibrator source essentially consists of a mass that is mounted so that it can be subjected to a vibratory motion, and seismic energy is generated as a result of the impact between the vibrating mass and the earth's surface. The vibrator mass is often mounted on a vehicle that is provided with an engine to power the movement of the vibrator mass.

When a vibrator is used as a seismic source in a land-based survey, a variety of noise signals are produced and these considerably reduce the signal-to-noise ratio of the seismic data that can be used to obtain information about the static shift. One noise signal is engine noise—this is incoherent noise generated by the vibrator engine and is characterised by spectral lines as well as a broader-band spectrum covering the entire range of seismic signals. Engine noise degrades the overall signal-to-noise ratio of the source signal.

Another noise signal arises owing to vibrator non-linearity. A conventional vibrator used in seismic surveying generates a considerable quantity of non-linear noise, such as higher harmonics and sub-harmonics. This non-linear noise is the result of an out-of-balance of the harmonic oscillator, which consists of the vibrator mass and the elastic cavities of the ground.

As noted above, a typical land-based seismic survey uses an array of seismic sources. This may give rise to interference signals resulting from imperfect super-position of the individual source fields in the near-field of the source array. Interference signals or beating signals generated in this way cause coherent degradation of the source wave-field, and are known as vibrator array near-field effects.

In addition to the above noise signals, a variety of signals are generated in addition to the intended vibrator output. These additional signals include ground roll waves, surface waves, and airwaves.

The seismic source is designed to generate a down-going wave-field of compression waves. However, owing to the limited spatial extend of the source area, edge-effects occur. These edge-effects result in surface waves having transverse components.

The vibrator mass of a vibrator source generates waves in the air, a phenomenon usually called airwaves, in addition to generating waves in the earth. The airwave has hitherto been regarded as a coherent noise feature that needs to be removed from the seismic data by later processing.

The inventors have realised that the ground roll wave, surface waves and/or airwaves may be used to provide information about the properties of the near-surface. For example, even though the generation of surface waves is an unintended by-product, these waves propagate through the near-surface layer and may therefore be used to provide information about the near-surface. Furthermore, it has been observed that, under some circumstances, surface waves of very shallow penetration are generated by the airwave produced by a vibrator. Owing to the weak attenuation of the airwave with a distance, and to the virtually "noise-free" generation of the surface wave from the airwave, the airwave-driven "surface wave fan" may be used to determine propagation velocities in the immediate near-surface.

A first aspect of the present invention provides a method of seismic surveying comprising the step of acquiring first seismic data relating to underlying geological structure at a survey location; wherein the method comprises the further step of acquiring second seismic data relating to the near-surface at the survey location, the step of acquiring the second seismic data being performed simultaneously or substantially simultaneously with the step of acquiring the first seismic data.

The conventional approach to the problem of the static shift produced by the near-surface is to carry out two separate surveys at a survey location. One survey is intended to collect imaging data, and uses a source array and a receiver array specifically intended to provide high-quality imaging data. A second survey is then carried out at the same location, using a different source array and a different receiver array, with the new source and receiver arrays being designed to provide high-quality information about the near-surface layer. Information acquired in the survey is used to correct the imaging data for the effects of the near-surface. While this approach can provide good results the need to carry out two separate surveys means that it is expensive and time-consuming. The present invention, in contrast, makes possible the simultaneous or near-simultaneous acquisition of imaging data and statics data and so reduces the duration and cost of a seismic survey.

In one embodiment the method of the present invention comprises actuating a first seismic source and acquiring the first seismic data at a receiver array of one or more receivers, and the step of acquiring the second seismic data comprises actuating a second seismic source different from the first seismic source and acquiring the second seismic data at the same receiver array. The first seismic source acts as an "imaging source", and provides imaging data about the underlying geological structure, whereas the second seismic source acts as a "statics source" and provides statics data about the near-surface.

The method preferably comprising the step of encoding seismic energy emitted by at least one of the first and second seismic sources. This makes determining whether an event in the data acquired at the receiver array arises from seismic energy emitted by the first seismic source or by the second seismic source easier and more reliable. Ways of encoding seismic energy include using sources that emit energy in different frequency ranges, delaying actuation of one of the seismic sources relative to the actuation of the other of the seismic sources, and/or spatially separating the first and second seismic sources.

In an alternative embodiment the method comprises the step of actuating a seismic source to emit seismic energy, and acquiring the first and second seismic data at a receiver array in consequence of the actuation of the seismic source. In this embodiment ground roll waves, surface waves and/or airwaves may be used to obtain statics data at the same time as the imaging data is acquired.

The method may comprise processing the second seismic data to obtain information about the near-surface and/or to obtain information about receiver perturbations.

The method may comprise processing the first seismic data to obtain information about the underlying geological structure on the basis of the information about the near-surface and/or information about the perturbations of the receiver.

The method of the invention does not require the use of receivers buried within the earth, and may be carried out using only receivers disposed on or at the earth's surface.

A second aspect of the invention provides a method of seismic surveying comprising the steps of actuating a source of seismic energy thereby to generate surface waves and acquiring seismic data relating to the near-surface at the survey location from the surface waves.

A third aspect of the invention provides a method of seismic surveying comprising the steps of actuating a source of seismic energy thereby to generate airwaves and acquiring seismic data relating to the near-surface at the survey location from the airwaves.

A fourth aspect of the present invention provides a seismic surveying arrangement comprising: a first seismic source adapted to illuminate an underlying geological structure with seismic energy; a second seismic source; control means for actuating the first and second seismic sources substantially simultaneously; and a receiver spatially separated from the first seismic source and from the second seismic source.

Preferred features of the invention are set out in the dependent claims.

Preferred embodiments of the present invention will be described by way of illustrative example with reference to the accompanying figures in which.

Figure 8:
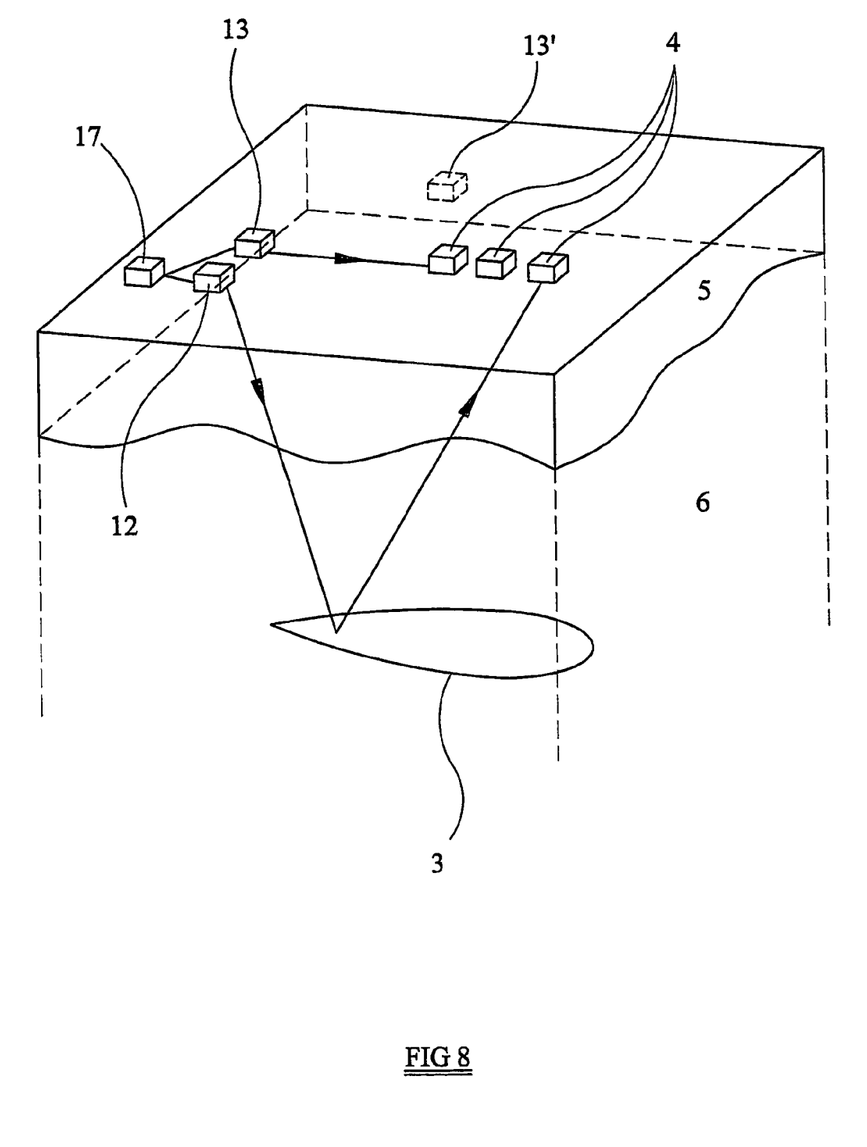
FIG. 8 is a schematic illustration of one embodiment of the present invention.

One embodiment of the present invention is illustrated in FIG. 8. FIG. 8 shows a land-based seismic surveying arrangement in which two seismic sources 12, 13 are disposed on the earth's surface. The source 12 is intended to provide information about a target geological structure 3, and will be referred to as a "imaging source". The other source 13 is intended to provide information about the near-surface, and will be referred to as a "statics source". In practice, the statics source 12 and the imaging source 13 are each likely to consist of an array of seismic sources, but only a single imaging source 12 and a single statics source 13 are shown in FIG. 8.

The statics source 13 and the imaging source 12 are each connected to a control means 17. The control means is able to actuate the imaging source 12 and/or the statics source 13 when desired, for example by sending an electrical actuating signal to the source(s) it is desired to actuate.

The amplitude of seismic energy emitted by the imaging source 12 upon actuation by the control means is sufficient to illuminate geological structures deep within the earth. Thus, when the imaging source 12 is actuated seismic energy is emitted downwards into the basement, and is reflected by one or more geological structures 3 located within the basement that act as partial reflectors of seismic energy. The reflected seismic energy is incident on a receiver array 4 located at the earth's surface. As can be seen, operation of the imaging source is essentially conventional.

The statics source 13 is intended to provide information about the near surface 5. Information about the near surface may be determined from the direct arrival produced as a result of actuation of the statics source 13. The direct arrival corresponds to seismic energy that has travelled from the statics source 13 to the array of receivers 4 along a path that lies wholly within the near-surface 5, such as the path 19 in FIG. 1. The seismic energy produced by the statics source is not required to penetrate deep into the basement 6, but needs only to penetrate the near-surface which typically has a thickness from a few meters up to around 100 meters. The statics source is therefore preferably a small, but highly linear, seismic source. One suitable source is an electro-magnetic shear vibrator manufactured by Oyo.

As noted above, the imaging source 12 will generate a direct wave, that propagates through the near-surface 5 to the array of receivers 4. The events in the seismic data that arise from this direct wave from the imaging source 12 are however not suitable for determining properties of the near-surface 5. As noted above, the imaging source 12 will in practice consist of an array of high-energy seismic sources. The energy emitted by the imaging source 12 will contain noise from various sources, as described above, and, furthermore, interference effects will occur between the signals emitted from the individual receivers in the array. As a result, it is not possible to make an accurate determination of the static shift from the direct wave generated by the imaging source 12. In the embodiment of FIG. 8, in which two seismic sources are used, it is therefore necessary to distinguish the direct wave arrival from the imaging source 12 from the direct wave arrival from the statics source in order to obtain accurate information about the near-surface. Accordingly, the seismic energy emitted by at least one of the imaging source and the statics source is preferably encoded in some way so that it is possible to make a reliable determination as to which source was responsible for a particular event in the seismic data acquired at the receiver.

In one embodiment the seismic energy emitted by the imaging source and the statics source are frequency-encoded. In this embodiment the imaging source and the statics source emit seismic energy in different, preferably non-overlapping, frequency ranges.

A typical land vibrator source that would be suitable for use as the imaging source 12 does not emit seismic energy at a single frequency. Instead the vibrator is actuated so as to emit seismic energy over a range of frequencies, so that the act of actuating the vibrator is normally referred to as a "sweep". The sweep that is required for the imaging source is determined by parameters such as the desired resolution, the absorption characteristics of the target geological structure, and the angle of incidence that seismic energy will make on the target structure. Usually, such sweeps employ a frequency range that has a lower limit of around 5 to 10 Hz and has an upper limit of around 60 to 100 Hz. This embodiment of the invention employs a statics source that operates in a different frequency band to the imaging source, to ensure that the signal from the statics source 13 can be distinguished from the signal from the imaging source 12. Preferably the frequency band of the statics source does not overlap the frequency band of the imaging source. (In principle the statics source could emit seismic energy nominally at a single frequency, but in practice the statics source is likely to be a source that is swept is the manner described above and so emits seismic energy over a defined frequency range.) In this embodiment the direct arrival from the statics source may easily be located in the acquired seismic data, since it will be the first seismic energy arrival in the frequency band of the statics source 13. The direct arrival from the statics source may conveniently be identified by cross-correlating or deconvolving the acquired seismic data with the source signature of the statics source, although in principle any suitable technique may be used to identify the direct arrival from the statics source. Cross-correlating or deconvolving the acquired seismic data with the source signature of the imaging source will identify events in the acquired seismic data arising from actuation of the imaging source.

The direct arrival from the statics source 13 may be considered as a shear-wave "first break". It may be processed in the same way as a p-wave first break, so that any p-wave first break processing technique or processing algorithm may be applied to the direct arrival from the statics source 13.

The frequency range of the imaging source 12 is likely to extend down to a lower frequency limit of 5 or 10 Hz. It is therefore preferable if the statics source 13 has a frequency band that is above the frequency band of the imaging source 12. A frequency band from, for example, 150 Hz to 200 Hz would be suitable for the static source.

An alternative method of ensuring that the direct arrival from the statics source 13 can be distinguished from other events in the seismic data acquired at the array of receivers 4 is to introduce a time delay between the start of the sweep of the static source and the start of the sweep of the imaging source. This may be considered as time-encoding.

For example, the control means 17 could be arranged to actuate one of the imaging or statics source, wait a pre-determined time, and then actuate the other source. One convenient way is to delay the start of the sweep of the imaging source 12 a pre-determined time—for example by a time delay in the range of about 0.5 to 1.0 seconds—after the start of the sweep of the statics source 13. This would ensure that the direct arrival from the statics source 13 would be the first event recorded at the receivers 4, and would not be obscured by events due to actuation of the imaging source 12. Again, the direct arrival from the statics source may conveniently be identified by a cross-correlation or deconvolution technique.

The time required to sweep the imaging source 12 will typically be in the range from 3 to 10 seconds. The two sweeps may therefore be considered as being essentially simultaneous, since the time delay of 0.5 to 1.0 seconds is between 5% to 33% of the length of the sweep of the imaging source. (It should be noted that the time required to sweep the static source may well be shorter than the sweep time of the imaging source, since the static source only needs to emit sufficient energy to penetrate the weathering layer.)

It should be noted that the time delay between the static source sweep and the imaging source sweep can be greater than the range of 0.5 to 1.0 seconds suggested above. However, choosing a time delay that is significantly greater than the delay required to provide clear identification of the direct arrival from the statics source 13 will not provide significantly better results. The only effect of increasing the delay time would be to prolong the time required to carry out the survey. It is therefore preferable that the delay time is chosen to be as small as possible while still allowing accurate identification of the direct arrival from the static source.

In principle, the time delay between the start of the sweep of the static source and the start of the sweep of the imaging source could be a time delay of a few samples since this would in principle be sufficient to distinguish the direct arrivals from the two sources. In practice, however, the signal acquired at the receiver 4 will be smeared as a consequence of attenuation and dispersion within the earth, so that accurate identification of the direct arrival from the statics source 13 may not be possible with such a short time delay.

In a further embodiment of the invention, the statics source 13 is not located adjacent to the imaging source 12, but is located at a distance from the imaging source 13. This may be considered as positional-encoding.

A suitable location for the statics source in this embodiment is shown in broken lines in FIG. 8 and is denoted by 13'. Introducing an offset between the imaging source 12 and the statics source 13' prevents the cross-feed of engine noise from the imaging source into the data acquired from the statics source 13'. Furthermore, if the statics source is located such that distance between the statics source 13' and the receiver array is smaller than the distance between the imaging source 12 and the receiver array, then the spatial offset between the sources has the effect of introducing a time delay between the arrival of the direct wave from the static source at the receiver array and the arrival of the direct wave from the imaging source 12. The offset between the statics source and the imaging source can be chosen to provide a desired time delay between the arrival of the direct wave from the static source at the receiver array and the arrival of the direct wave from the imaging source 12.

Offsetting the imaging source and the statics source in radial direction, so that the two sources were separated from one another but were at approximately the same distance from the receiver would not introduce a time delay between the arrival of the direct wave from the static source at the receiver array and the arrival of the direct wave from the imaging source 12. However, the offset would prevent the cross-feed of engine noise from the imaging source into the data acquired from the statics source 13'. The combination of a radial offset between the imaging source and the statics source in combination with frequency encoded sweeps and/or a time delay between sweeps may therefore be useful in some cases.

In use, the control means 17 actuates the imaging source 12 and the statics source 13 to emit seismic energy. The sources may be actuated simultaneously or the control means may provide a small pre-determined time delay between actuation of one source and actuation of the other source. As a consequence of actuation of the sources seismic data are recorded at each receiver 4. The data acquired at each receiver will, in general, contain events due to seismic energy emitted by the imaging source 12 and events due to seismic energy emitted by the statics source 13. The receivers may acquire single component or multi-component seismic data, and the acquired data can be stored in any suitable manner.

When the data is analysed the initial step is to determine which event in the data acquired by a receiver is the direct arrival of seismic energy from the statics source 13.

The direct arrival from the statics source 13 is identified in the data acquired at each receiver in the array. Once the direct arrival has been identified it is possible to obtain information about the static shift at each receiver position. In outline, the path length from the static source 13 to each receiver 4 is known, so that the path length difference to each receiver 4 in the array can be determined. Any differences in the arrival time of the direct wave at each receiver that cannot be explained on the basis of the different path length can be ascribed to variations in the static shift from one receiver position to another. Information about the static shift may be derived in any suitable way.

If the receivers 4 are multiple-component receivers it is possible to obtain information about the static shift for both p-waves and s-waves.

Once information about the static shift at each receiver position has been obtained, it is then possible to obtain information about the receiver perturbation at each receiver position. This may be done using any suitable conventional technique.

Once the information about the static shift at each receiver position, and about the receiver perturbation at each receiver position, has been determined, it is then possible to correct the data acquired from the actuation of the imaging source 12 to account for the static shift and receiver perturbation at each receiver position. This allows the data from the imaging source 12 to be processed in a way that takes account of the static shift and the receiver perturbation, so that it is possible to obtain more accurate information about the geological structure of the basement 6. These data processing steps may be performed in any suitable manner.

The present invention thus enables information about the near surface to be obtained using one or more receivers disposed on or at the earth's surface. The invention does not require receivers buried within the earth.

Three methods of encoding the seismic energy emitted by the two seismic sources, so that the direct arrival from the statics source 13, 13' maybe reliably distinguished from data from the imaging source 12, have been described above. It is possible to combine two or even three of these methods in a single seismic survey. For example, it would be possible to use a statics source that had a frequency band that was outside the frequency band of the imaging source, and also to introduce a time delay between the start of the sweep of the static source and the start of the sweep of the imaging source. It would further be possible to introduce a spatial separation between the statics source and the imaging source, and this would further increase the time difference between the arrival of the direct wave from the static source and the first arrival of data from the imaging source. Alternatively, it would be possible to use a statics source that had a frequency band that was outside the frequency band of the imaging source, introduce a spatial separation between the statics source and the imaging source, but arrange the control means to actuate the imaging source and the statics source simultaneously.

Figure 5:
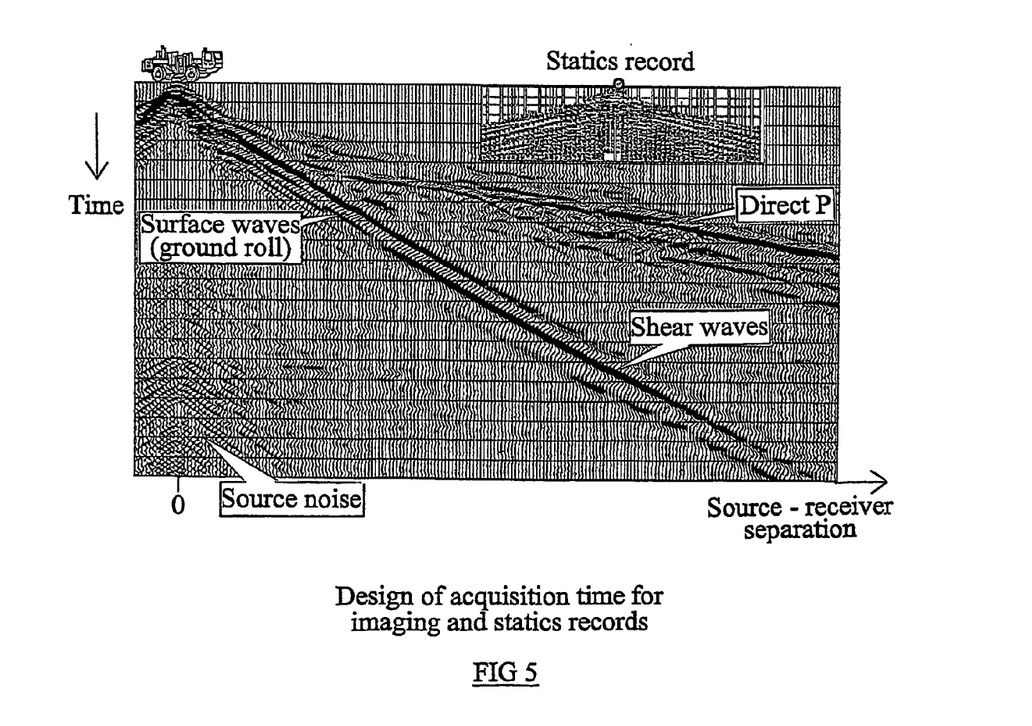
FIG. 5 is a schematic illustration of seismic data acquired in a method of the invention.

FIG. 5 illustrates the seismic data that may typically be recorded at a receiver when the imaging source 12 is actuated. The horizontal axis of FIG. 5 represents the horizontal difference between the receiver and the imaging source, and the vertical axis of the receiver represents the time since actuation of the imaging source. It can be seen that, at most values of the separation between the receiver and the imaging source, the first significant recorded event is the direct arrival—that is, energy that has travelled direct from the imaging source to the receiver through the near surface. FIG. 5 also shows, as an inset, events obtained by actuation of the statics source, which is assumed to be spatially separated from the imaging source.

Figure 6:
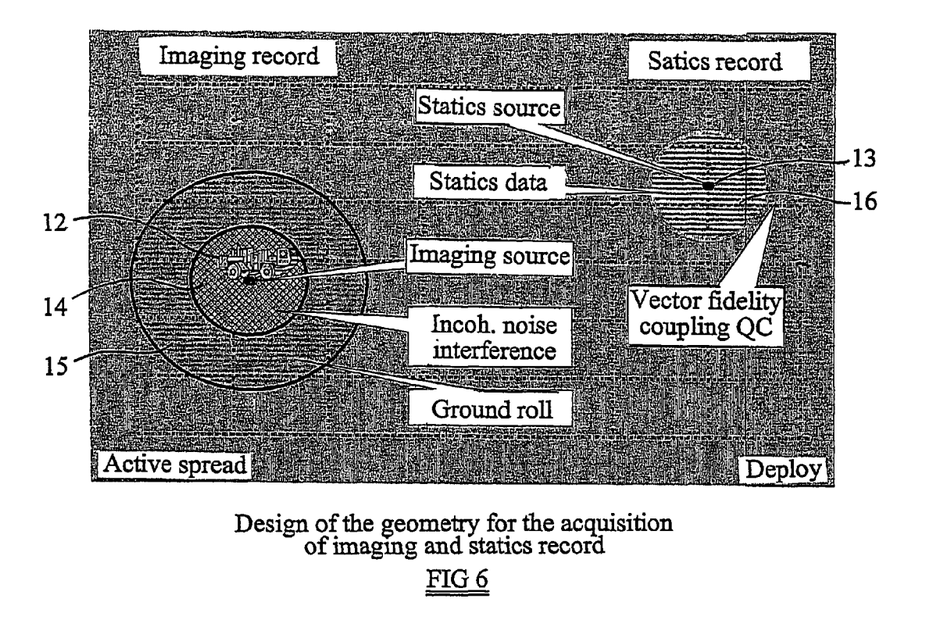
FIG. 6 is a schematic illustration of the geometry required for one embodiment of the present invention.

FIG. 6 is a partial schematic plan view of seismic surveying arrangement of the invention that includes an imaging source and a statics source that is spatially separated from the imaging source. FIG. 6 indicates the approximate area 14 around the imaging source 12 in which incoherent noise occurs, and also indicates the area 15 in which ground roll noise occurs. FIG. 6 also indicates the area around the statics source 13 in which statics data may be acquired. Preferably, the sources are located relative to one another, and relative to the receiver, so that the receiver (not shown) is in the area 16 around the statics source in which statics data may be acquired, but is outside the areas 14 and 15 in which the imaging source gives rise to incoherent noise and ground roll noise. The statics source 13 is preferably offset from the imaging source 12 so that it lies outside the areas 14 and 15 in which the imaging source gives rise to incoherent noise, interference and ground roll noise.

Figure 7:
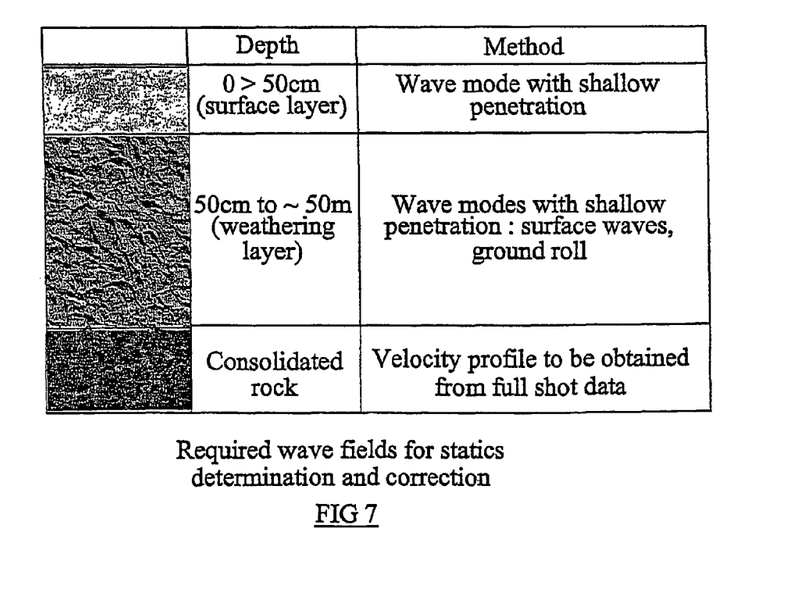
FIG. 7 illustrates the required wave fields for the determination and correction of static shifts.

FIG. 7 is a schematic illustration of the wave fields that are required to enable complete correction of imaging data for the effects of the near surface. As noted above, the near-surface does not always extend to the earth's surface, and there is sometimes a thin "immediate near-surface" layer overlying the near-surface. Where such a layer exists, a wave mode that has very shallow penetration into the earth is required in order to provide information about the properties of this surface layer. As noted above, the airwave-driven "surface wave fan" produced by an imaging source may be used to determine propagation velocities in the immediate near-surface.

As noted above, a wave mode that has shallow penetration, and does not penetrate into the basement 6, will propagate only through the near-surface (or weathering layer). Such a wave mode may therefore provide information about the properties of the near-surface. Suitable wave modes include the direct wave from a suitable statics source, and also include surface waves and ground roll waves generated by an imaging source.

Finally, in order to obtain information about the geological properties of the basement, (consolidated rock) a full set of imaging data from a suitable imaging source is required.

In an alternative embodiment of the invention, only one seismic source is used to provide both the imaging data and the statics data As explained above, the direct wave from an imaging source is generally unsuitable for providing information about the near-surface. This embodiment therefore does not attempt to make use of the direct wave produced by the imaging source, but instead uses at least one of ground roll waves, surface waves and airwaves generated by the imaging source to provide information about the near-surface. In this embodiment, events in the seismic data acquired at a receiver that arise owing to at least one of ground roll waves, surface waves and airwaves are identified. These events relate to seismic energy that has travelled only through the near-surface, and so may be used to obtain information about the properties of the near-surface. Again, these provide a shear wave first break, which may be processed in the same way as a p-wave first break.

This embodiment may again be carried out using receivers disposed at or on the earth's surface, and it does -not require receivers to be buried- within the earth.

This embodiment of the invention is preferably carried out with a high-quality low penetration source. This avoids the engine noise and non-linearity of a conventional large vibrator source. Furthermore, a small vibrator will generate considerably less ground roll and surface waves, and also generate less airwaves, than a conventional vibrator. The lower amplitude of these waves means that the waves should be more linear, and are therefore more suitable for determining information about the properties of the near-surface.

The invention claimed is:

1. A seismic surveying arrangement, comprising:
a first array of seismic sources configured to provide imaging data about an underlying geological structure;
a second array of seismic sources configured to generate a set of waves that travel substantially within a near surface layer;
control means for actuating the first and second array of seismic sources substantially simultaneously; and
a receiver array for recording seismic data from the first array of seismic sources and the second array of seismic sources.

2. The seismic surveying arrangement of claim 1, wherein the frequency range of a set of waves generated by the first array of seismic sources does not overlap with the frequency range of the set of waves generated by the second array of seismic sources.

3. The seismic surveying arrangement of claim 1, wherein the control means is configured to actuate one of the first and second array of seismic sources a predetermined time after actuating the other of the first and second array of seismic sources.

4. The seismic surveying arrangement of claim 3, wherein the control means is configured to actuate the second array of seismic sources a predetermined time before actuating the first array of seismic sources.

5. The seismic surveying arrangement of claim 3, wherein the predetermined time is less than 1.0 second.

6. The seismic surveying arrangement of claim 1, wherein the first array of seismic sources and the second array of seismic sources are separated from the receiver array by substantially the same distance.

7. The seismic surveying arrangement of claim 1, wherein the second array of seismic sources is separated from the first array of seismic sources in a radial direction from the perspective of the receiver array.

8. The seismic surveying arrangement of claim 1, wherein the distance between the receiver array and the second array of seismic sources is less than the distance between the receiver array and the first array of seismic sources.

9. The seismic surveying arrangement of claim 1, wherein the second array of seismic sources comprises electromagnetic shear vibrators.

10. The seismic surveying arrangement of claim 1, wherein the second array of seismic sources are configured to provide statics data about the near surface layer.

11. The seismic surveying arrangement of claim 7, wherein the first array of seismic sources and the second array of seismic sources are separated from the receiver array by substantially the same distance.

12. A seismic surveying arrangement, comprising:
a first array of seismic sources configured to provide imaging data about an underlying geological structure;
a second array of seismic sources configured to generate a set of waves that travel substantially within a near surface layer;
control means for actuating the first and second array of seismic sources substantially simultaneously; and
a receiver array for recording seismic data from the first array of seismic sources and the second array of seismic sources, wherein the distance separating the second array of seismic sources from the first array of seismic sources is selected to provide a time delay between the arrival of a direct wave from the second array of seismic sources at the receiver array and the arrival of a direct wave from the first array of seismic sources at the receiver array.

13. The seismic surveying arrangement of claim 12, wherein the frequency range of the second array of seismic sources ranges from about 150 Hz to about 200 Hz.

* * * * *